United States Patent [19]

Idland

[11] Patent Number: 4,749,222

[45] Date of Patent: Jun. 7, 1988

[54] SUN SHADES FOR VEHICLES

[76] Inventor: Carsten H. Idland, 3450 B Mt. View, Los Angeles, Calif. 90066

[21] Appl. No.: 12,055

[22] Filed: Feb. 6, 1987

[51] Int. Cl.⁴ .............................................. B60J 3/00
[52] U.S. Cl. .............................. 296/97 C; 296/97 F; 160/DIG. 2
[58] Field of Search ............... 296/97 D, 97 R, 97 C, 296/97 F; 160/23 R, DIG. 2; 428/31, 101, 213, 220, 430, 441, 442

[56] References Cited

U.S. PATENT DOCUMENTS 3,868,293  2/1975  Selph ................................ 296/97 D
4,353,593  10/1982  Henson ............................ 296/97 D Primary Examiner—Robert R. Song
Attorney, Agent, or Firm—William W. Haefliger

[57] ABSTRACT

Combined with vehicle glass window is:
(a) a sheet of vinyl plastic material applied to the surface of the window to electrostatically adhere to the window surface and act as a sun shield,
(b) the sheet having a thickness less than about 0.02 inch,
(c) the maximum cross dimension of the sheet being less than 10 inches, whereby the sheet is easily shifted.

17 Claims, 2 Drawing Sheets

U.S. Patent    Jun. 7, 1988    Sheet 1 of 2    4,749,222
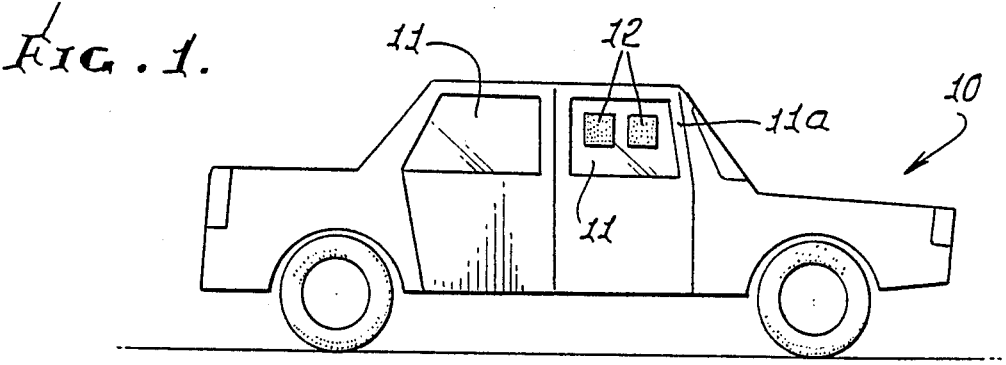
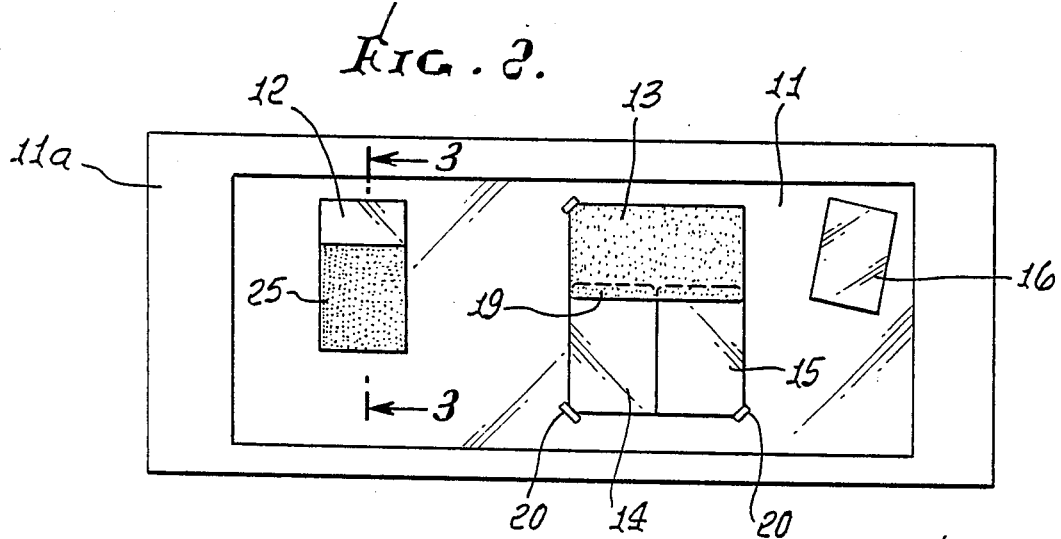
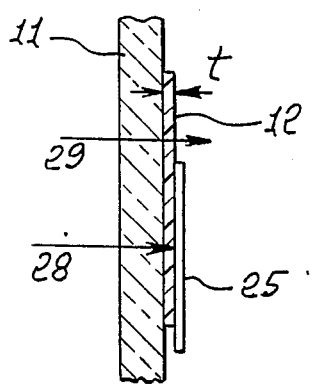
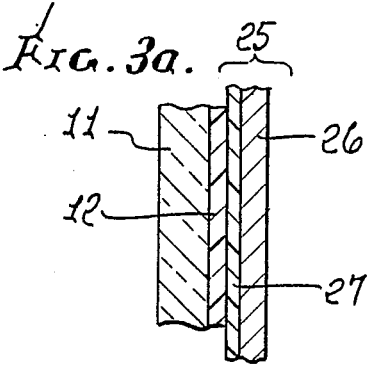
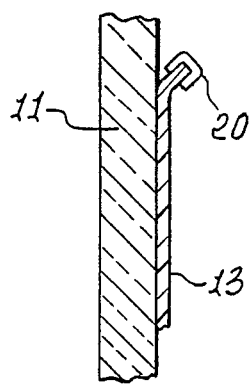
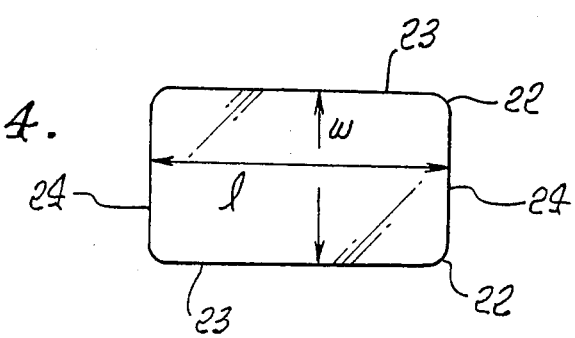

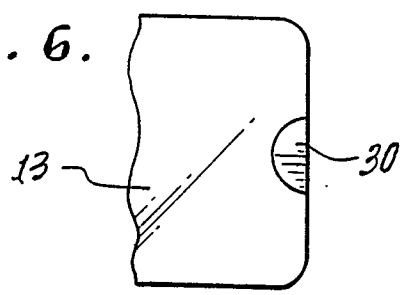
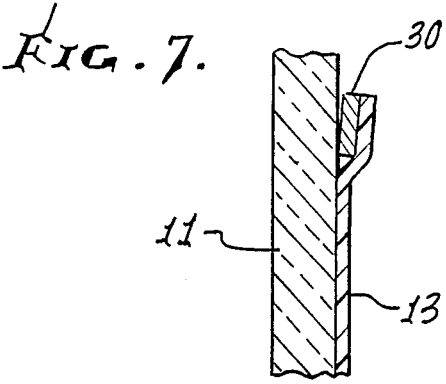
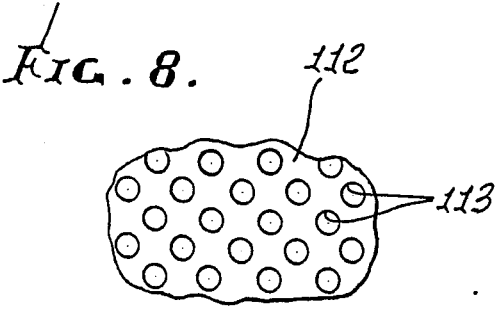
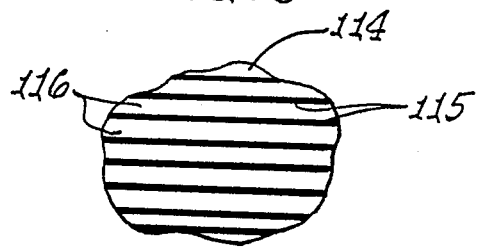
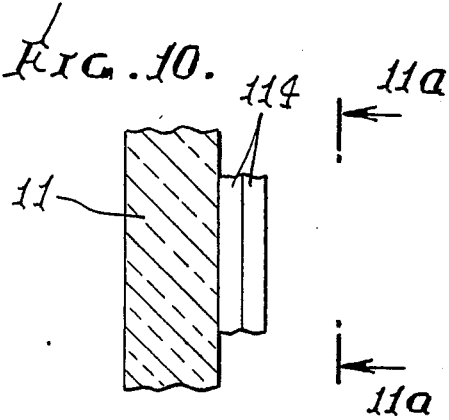
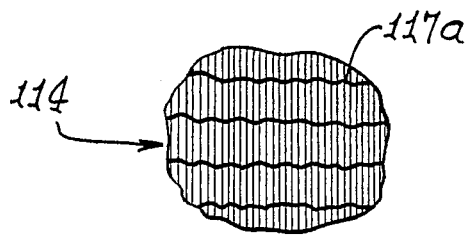
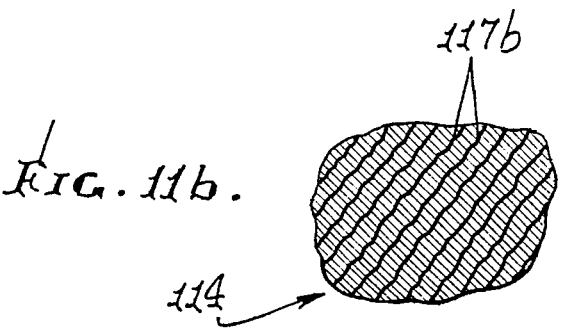

SUN SHADES FOR VEHICLES

BACKGROUND OF THE INVENTION

This invention relates generally to sun shades for use on vehicle windows; more particularly, the invention concerns a vinyl film shade of a size to be easily accomodated to window size, as by employing multiple of the sheets on a window.

There is a need for easily deployed and shiftable sun shades, useful in association with vehicle windows. As the vehicle orients differently relative to the sun, the shades need to be deployable to different positions, for example. Thus, a vehicle occupant needs ability to shift the shade easily, as with one hand. Shade opaqueness is desirable for some window areas, whereas shade transparency is desirable for viewing through other window areas.

SUMMARY OF THE INVENTION

It is a major object of the invention to provide a shade or shades of a size and character meeting the above needs.

Basically, the sun shade of the invention is characterized by:

(a) a sheet of vinyl plastic material applied to the surface of the window to electrostatically adhere to the window surface and act as a sun shield, (b) said sheet having a thickness less than about 0.02 inch, (c) the maximum cross dimension of the sheet being less than 10 inches, so that the shade is easily shifted about.

As will appear, the sheet or film thickness is preferably about 0.008 inches; and it has a length dimension between 6 and 10 inches and a width dimension between 4 and 8 inches. It is a plasticized vinyl film to render it clinging to glass; and it may be opaque or transparent with a printed, opaque, uniform pattern, or opaque with small holes cut out in a uniform pattern, that different shades of these latter qualities may be applied to different window areas, and shifted about, as needed, as during driving. Thus, multiple sheets may be applied to the surface of the window to electrostatically cling to that surface and act as a sun shade, the sheets being individually substantially smaller than the window area, and selectively applied to different parts of the window area to be shaded. The sheets may overlap one another; and handles or tabs may be locally attached to the sheets to facilitate their shifting. Ease of sheet removal and application, without bunching, is provided by rounding sheet corners. Variance of shade light transmission is also achieved. The composition of the plasticized film may include a component which absorbs ultra violet light for additional protection of vehicle occupants.

Such sheets may be used for sunvisors in vehicles; removable sun curtains; sun protection for car interiors; removable window tinting; and side view mirror dimmers.

These and other objects and advantages of the invention, as well as the details of an illustrative 2 embodiment, will be more fully understood from the following specification and drawings, in which:

DRAWING DESCRIPTION

FIG. 1 is a side elevation showing an automobile having a glass window to which an shield sheet or film in accordance with the invention is applied;

FIG. 2 is an enlarged view of a vehicle window to which multiple sun shields are applied in selected configurations;

FIG. 3 is an enlarged fragmentary section taken on lines 3—3 of FIG. 2; FIG. 3a is a further enlargement;

FIG. 4 is a side view of a sun shield showing its curved corners;

FIG. 5 is a section like FIG. 3, but showing a handle on an edge portion of the shield;

FIG. 6 is a section like FIG. 4, but showing a tab on an edge portion of the shield;

FIG. 7 is a section like FIG. 3, but showing the cross section of the tab shown in FIG. 6;

FIG. 8 is a view of a shade sheet containing holes;

FIG. 9 is a view of a shade sheet bearing a printed opaque pattern;

FIG. 10 is a sectioned view of two superposed sheets like FIG. 9;

FIG. 11a is a frontal fragmentary view on lines 11a–11a of FIG. 10, showing an interference pattern; and FIG. 11b is a view like FIG. 11a showing a modified interference pattern.

DETAILED DESCRIPTION

Referring to FIGS. 1–3, a vehicle such as an automobile 10 has a glass windows 11 in a door frame 11a, for example. Applied to at least one of the windows are one or more sheets 12-16 of vinyl plastic material. The sheets have flat faces that directly engage and electrostatically cling to the window surface and act as a sun shade or shades. Such sheets are individually substantially smaller in area than the window area, to be easily applied, shifted about, and removed, and typically the maximum cross dimension such as the length, for example of each sheet in less than 10 inches. Note for example the sheet of FIG. 4 of length "l" and width "w", where "l" is between 6 and 10 inches (but preferably about 6 inches). The sheet thickness "t" as seen in FIG. 3 is less than 0.02 inches, and typically about 0.008 inches.

The vinyl material is a plasticized polyvinylchloride film, of the following approximate composition: polyvinylchloride copolymer containing a plasticizer such as dioctyl phthalate. It is typically of "8S" softness. The material is not a perfectly clear material, but is darkened somewhat as by a colorant such as a dye or filler. Sheets of such material are known, and sold by Catalina Plastic, Glendale, Calif. The sheet may be transparent, or opaque, the latter offering the maximum sun shade. Sheets are typically applied to those portions of the window through which the sun might otherwise pass to impinge on the vehicle occupant. See for example opaque sheet 13 and transparent sheets 14 and 15 as well as at 12 and 16. One advantage of sheets of the size ranges referred to is the possibility that they can be selectively applied over different window areas (upper and lower for example, and as described) and another advantage is the possible selective overlapping of the sheets, as seen at 19 in FIG. 2, to fit or fill window areas, and also perform different degrees of sun shading, in different selected window areas, to provide different degrees of visibility. Rapid shiftability of the sheets to different window portions is also enabled, due to their sizes. Handles or tabs 20 of tape or other material are provided on one or more sheets, as shown in FIGS. 2 and 5, to facilitate easy removal of the sheets, as for re-positioning. FIGS. 6 and 7 show edge tabs 30 which may be printed on or otherwise attached to the film. The handles or tabs may be applied to rounded corner extents of the sheets, as shown. Such rounded corners also appear at 22 in FIG. 4, joining the longitudinal and lateral edges 23 and 24 of the sheet.

Such sheets are easily stored in vehicle glove compartments in crumpled condition, and they smooth out when applied to glass surfaces.

FIG. 3 also shows an opaque backer 25 applied to a portion of the sheet 12 to prevent light transmission through the composite. The backer clings to the film 12 and may be removed at will. As shown in the enlarged section of FIG. 3a, the backer may consist of a hard paper layer 26 adhering to a sheet of the PVC film 12, to close off light transmission. See arrow 28 designating light transmission by film 12. The backer thickness is between about 0.03 and 0.10 inch. The PVC of the film may contain an ultra-violet ray blocking component, one example being benzophenones dissolved or dispersed in the PVC composition.

FIG. 8 shows a film 112 like that seen at 12 in FIG. 3, for example, except that it contains a uniform distribution of through openings or holes 113. The PVC sheet itself may be opaque, but the holes allow viewing through it, when applied to a vehicle window. FIG. 9 shows a film 114 like that at 12 in FIG. 3; but the film is transparent, and there are printed (ink) lines 115 on one surface of the sheet to allow reduced visibility through the narrow spaces 116 between the lines.

FIG. 10 shows two such sheets, of FIG. 9 type, applied to one another, one sheet adhering to a vehicle window 11. The lines 115 on one of the sheets 114 extend crosswise of the lines on the other sheet, to reduce light transmission through the composite.

FIGS. 11a and 11b show shadowy interference pattern 117a and 117b obtained when the printed lines are extremely narrow to represent gratings. Shifting of the films relative to one another allows very quick variance in the opaque patterns as at 117a and 117b to obtain desired light transmission blockage.

I claim:

1. In combination with a vehicle glass window,
   (a) a sheet of vinyl plastic material having a flat face directly applied to the surface of the window to electrostatically engage and adhere to the window surface and act as a sun shield,
   (b) said sheet having a thickness less than about 0.02 inch,
   (c) the maximum cross dimension of the sheet being less than 10 inches, whereby the sheet is easily shifted.

2. The combination of claim 1 wherein the sheet thickness is about 0.008 inch.

3. The combination of claim 1 wherein the sheet is substantially rectangular, and has a length dimension between 6 and 10 inches and a width dimension between 4 and 8 inches.

4. The combination of claim 1 wherein the vinyl material is a plasticized vinyl film.

5. The combination of claim 1 wherein the vinyl material is one of the following:
   (i) substantially opaque
   (ii) substantially transparent
   (iii) transparent and having a uniform printed opaque pattern
   (iv) opaque and having holes cut out in a uniform pattern
   (v) composed of a component which absorbs ultra-violet light.

6. The combination of claim 3 wherein the sheet has rounded corners.

7. In combination with a vehicle glass window,
   (a) multiple sheets of vinyl plastic material having flat faces directly applied to the surface of the window to engage and electrostatically cling to that surface and act as a sun shade, the sheets being individually substantially smaller than the window area, and selectively applied to different parts of the window area to be shaded,
   (b) each sheet having a thickness less than about 0.02 inches.

8. The combination of claim 7 wherein each sheet is substantially rectangular, and has a length dimension between 6 and 10 inches and a width dimension between 4 and 8 inches.

9. The combination of claim 7 wherein the vinyl material is a plasticized vinyl film characterized as one of the following
   (i) substantially opaque
   (ii) substantially transparent
   (iii) transparent and having a uniformly printed opaque pattern
   (iv) opaque dand having holes cut out in a uniform pattern
   (v) composed of a component which absorbs ultra-violet light.

10. The combination of claim 1 including a thin handle locally attached to a sheet edge, to facilitate remove of the sheet from the window.

11. The combination of claim 1 including an opaque backer adherent to and removable from the vinyl sheet at the side thereof opposite the glass window.

12. The combination of claim 11 wherein the backer consists of a paper sub-sheet, and a polyurethane sub-sheet adherent to one side of the paper sub-sheet.

13. The combination of claim 1 including a thin tab adherent to a sheet edge portion, and printed thereon.

14. The combination of claim 1 wherein the sheet is opaque and has holes therethrough the holes uniformly distributed over the sheet.

15. The combination of claim 1 wherein the sheet is transparent and has opaque lines thereon, the lines spaced apart.

16. The combination of claim 15 wherein two such sheets are superposed on one another so that the lines on one sheet extend over the lines on the other sheet.

17. The combination of claim 16 optical wherein interference pattern are formed by the lines on the two sheets, said pattern being opaque and controlled in size by relative adjustment of the two sheets.

* * * * *